Jan. 16, 1968  F. ELFLEIN ET AL  3,363,386
RIVETLESS AND SCREWLESS CONNECTION FOR FORCE FIT
AND SLIDING FIT OF ADJACENT STRUCTURAL ELEMENTS
Filed Oct. 15, 1963

Inventors
F. Elflein, W. Hudetz
& T. Schwarz
By Lowry & Rinehart
ATTYS.

United States Patent Office
3,363,386
Patented Jan. 16, 1968

3,363,386
RIVETLESS AND SCREWLESS CONNECTION FOR FORCE FIT AND SLIDING FIT OF ADJACENT STRUCTURAL ELEMENTS
Friedrich Elflein, Mitterteich, Wilhelm Hudetz, Mannheim, and Theodor Schwarz, Hagen, Westphalia, Germany, assignors to Tartrizid-Gesellschaft Hackenbruch & Co., Hagen, Westphalia, Germany
Filed Oct. 15, 1963, Ser. No. 316,324
Claims priority, application Germany, Nov. 20, 1962, E 23,884; July 24, 1963, T 24,357
2 Claims. (Cl. 52—586)

ABSTRACT OF THE DISCLOSURE

A connection between two structural elements having identical but oppositely oriented complementary connecting portions each defined by a side edge formed with a claw-like projection and with a recess. The projection of each element is received in the recess of the other element, and the assembled projections define a closed space in which is inserted a coupling member.

---

This invention relates to a rivetless and screwless connection for force fit and sliding fit of adjacent plate-like structural elements which are to be united to form a large structure, for which purpose the end faces of thick walled structural elements are provided with grooved claw-like projections which in joined position supplement each other about halfway to form a hollow space in which a coupling element is inserted, abutments extend from each of the end faces for engagement with the outer surface of the claw-like projection of the adjoining end face so that in the joined position the ends of the claws bear against these abutment surfaces. As a result an absolutely twistproof fit is formed which then allows the use of coupling elements of any desired profile, such as come into question for example in the slabs or plate shaped members in the construction of prefabricated houses, the making of facade wall coverings, thick walled glazing or the like and in fact always where it is a question of a permanent or a disengageable connection of the structural parts which then require no further locking. As the arrangement functions positively or automatically during the process of fitting together, it is not possible to overlook anything which might cause accidents; while at the same time a rapid and reliable assembly, exactly to measure and capable of withstanding heavy loads, is ensured.

The design of the connection also allows advantageous modifications, such as corner or angle profiles.

The coupling elements used need not be of round cross section only but may also be elliptical, angular or of any polygonal shape, and the use of part components or even balls as coupling elements is also possible. A particular advantage of such a connection is also that the hollow space can be utilized for accommodating the supply conduits for media, such as water, gas, electric current and the like.

Such connections make it possible to produce a joint invisible from outside with low strength factors when subjected to thrust, tension or bending stresses. Another advantage over the known constructions of this type is that special locking means, such as sleeve members, additional cleats or the like can be dispensed with because the connection may be either produced with undetachable force fit or detachable sliding fit.

Several preferred embodiments of the invention will now be described by way of example and with reference to the accompanying drawings, in which.

Figure 1:
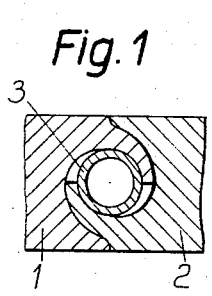
FIG. 1 is a section through interengaging portions of two structural elements with profiled end faces in joined position.
Figure 2:
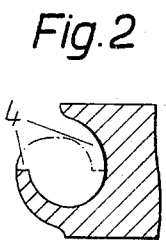
FIG. 2 is a section through one of these elements in free position.

FIGS. 1 and 2 show two connected structural elements 1 and 2, for example plates, slabs or the like, which are provided with claw-like projections 4 for interengagement. In the locked or coupled position, the inner surfaces of these projections 4 form a hollow space in which a coupling element 3, for example a tube, can be introduced, thereby to form a rigid joint. The outer surfaces of the claw-like projections 4 extend in conformity with the inner curved surfaces of abutments extending from the adjoining end faces for engagement of the claw-like projections and the abutments.

Figure 3:
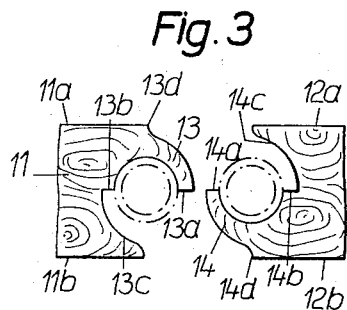
FIG. 3 is a schematic view of another embodiment with the structural elements in free position and having different end profiles using a circular coupling element such as a ball.
Figure 4:
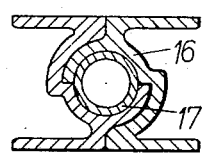
FIG. 4 is a section through the arrangement of FIG. 3, in the locked position.

FIG. 3 shows structural elements 11 and 12 having claws 13 and 14. The arms of the claws 13 and 14 extend from shoulders 13b or 14b, respectively, from which extend non-linear inner surfaces 13c and 14c of respective abutments along opposite outer walls 11b and 12a of the respective structural element. When the structural elements 11 and 12 are in interengagement, all the parts of the profile are in contact, with the walls 11a, 12a and 11b, 12b joined at points 13d, 14d and, as can be seen from FIG. 4, a profiled hollow space 16 is available for receiving a coupling element 17.

Figure 5:
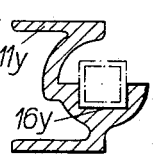
FIG. 5 is a section through similar structural elements using a square coupling element, in disengaged position.
Figure 6:
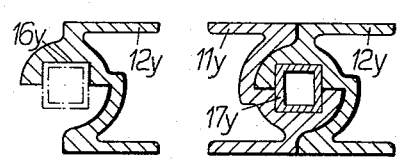
FIG. 6 is a section through the structural elements of FIG. 5 in the locked position.

In the arrangement illustrated in FIG. 5, a square hollow space 16y is provided in elements 11y and 12y for receiving a square coupling element 17y, as shown in FIG. 6.

Figure 7:
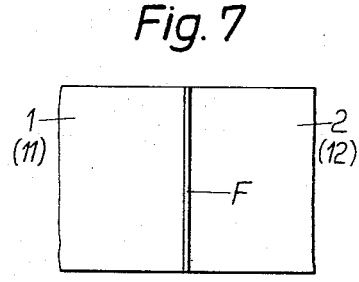
FIG. 7 is an elevation showing the joint between two structural elements.

From the part elevation shown in FIG. 7 it can be seen that only a vertical seam F is visible in such a connection.

Figure 8:
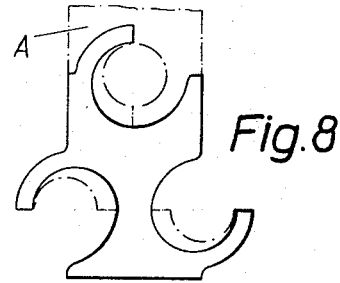
FIGS. 8 to 10 are different embodiments of corner connections.
Figure 10:
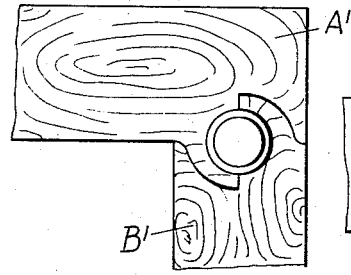
Figure 9:
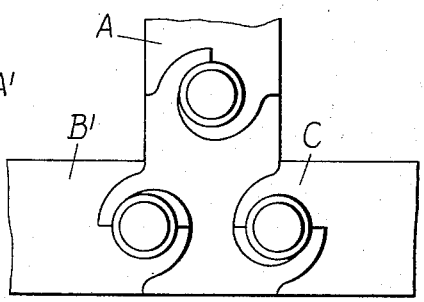

FIGS. 8 to 10 show schematically arrangements for corner or T-shaped connections. The structural elements illustrated in FIGS. 8 and 9 is provided with three profiled end faces, a structural element A being arranged, for example, at right angles to two further codirectionally extending structural elements B and C.

In the corner connection illustrated in FIG. 10 it can be seen what possibilities this arrangement offers, namely of forming such a corner connection from only two structural elements $A^1$ and $B^1$ for example of wood, of which the element $A^1$ has an extended arm, whereas the element $B^1$ is of the usual length.

We claim:
1. A rivetless and screwless connection between two plate-like structural elements wherein said elements have identical but oppositely oriented connecting portions in complemental engagement, the connecting portion of each element being defined by a side edge between two opposite faces of the element, said side edge being formed to provide a projection and a recess extending transversely from the respective opposite faces of the element to a central plane between said faces, said projection being in the form of a curved claw with an inner surface, a curved outer surface terminating in a stepped abutment at its junction with the adjacent face of the element, and a free end terminating at said central plane, said recess having a curved surface terminating in a heel at its junction with the face of the element adjacent thereto, said heel being transversely aligned with said stepped abutment, the projection of each element extending into the recess of the other element with the curved outer surface of the projection complementally engaging the curved surface of the recess and with the heel of each element engaging the stepped abutment of the other element, the inner surfaces of the projections defining a closed space intersected by the central plane of the elements, and a coupling member inserted in said space to hold the elements assembled.

2. The structure as defined in claim 1 wherein said side edge of each element is also formed with a stepped shoulder located in said central plane at the inner end of said recess, said shoulder of each element being abutted by said free end of the projection of the other element.

References Cited

UNITED STATES PATENTS

| | | | |
|---|---|---|---|
| 1,965,601 | 7/1934 | Kotrbaty | 52—586 X |
| 1,985,992 | 1/1935 | Hayman | 52—586 X |
| 2,947,040 | 8/1960 | Schultz | 52—585 X |
| 3,014,558 | 12/1961 | Noyes | 52—586 X |
| 3,036,671 | 5/1962 | Seipos | 52—626 X |
| 3,170,201 | 2/1965 | Nofziger | 52—731 |
| 3,185,267 | 5/1965 | Pavlecka | 52—293 X |

FOREIGN PATENTS

| | | |
|---|---|---|
| 520,541 | 6/1953 | Belgium. |
| 590,923 | 7/1947 | Great Britain. |

DAVID J. WILLIAMOWSKY, *Primary Examiner.*

DENNIS L. TAYLOR, *Examiner.*